A. B. THOMAS.
SHIELD FOR AUTOMOBILES.
APPLICATION FILED DEC. 14, 1910.
1,034,534.
Patented Aug. 6, 1912.
3 SHEETS—SHEET 1.
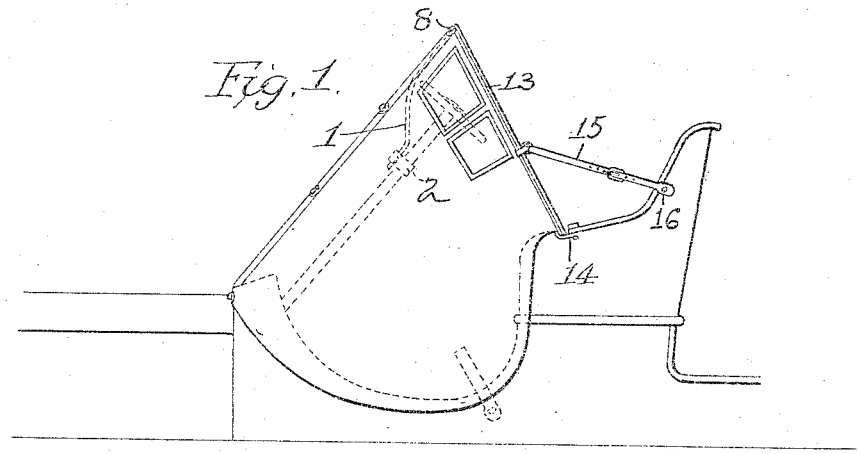
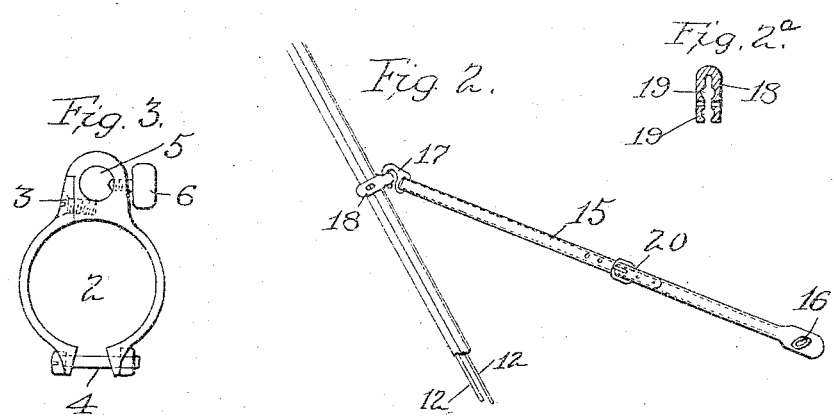
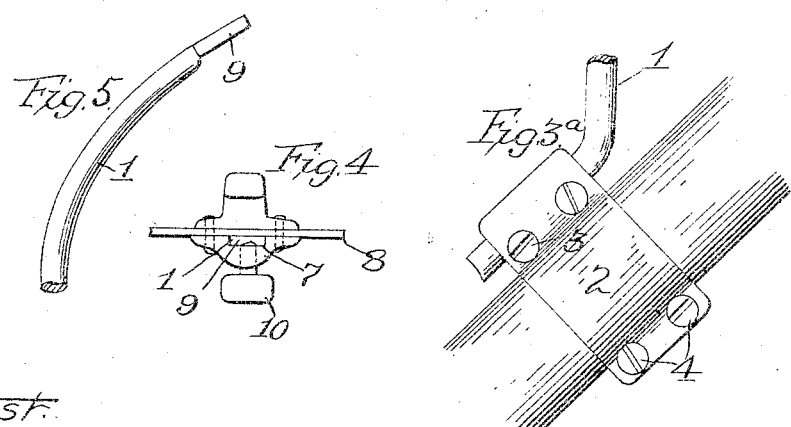
Inventor
A. B. Thomas.

A. B. THOMAS.
SHIELD FOR AUTOMOBILES.
APPLICATION FILED DEC. 14, 1910.

1,034,534.

Patented Aug. 6, 1912.
3 SHEETS—SHEET 2.

A. B. THOMAS.
SHIELD FOR AUTOMOBILES.
APPLICATION FILED DEC. 14, 1910.

1,034,534.

Patented Aug. 6, 1912.
3 SHEETS—SHEET 3.

UNITED STATES PATENT OFFICE.

ALMER B. THOMAS, OF HARDWICK, VERMONT.

SHIELD FOR AUTOMOBILES.

1,034,534.  Specification of Letters Patent.  Patented Aug. 6, 1912.

Application filed December 14, 1910. Serial No. 597,290.

*To all whom it may concern:*

Be it known that I, ALMER B. THOMAS, a citizen of the United States, residing at Hardwick, Vermont, have invented certain new and useful Improvements in Shields for Automobiles, of which the following is a specification.

My present invention is an improvement upon that disclosed in an application for Letters Patent of the United States filed by me February 26, 1910, #546,254, and it consists in the features of construction and combination and arrangement of parts hereinafter described and particularly set forth in the appended claim.

Figure 6:
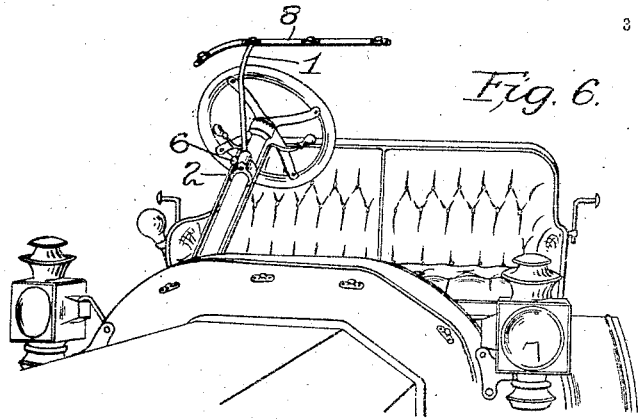
Figure 7:
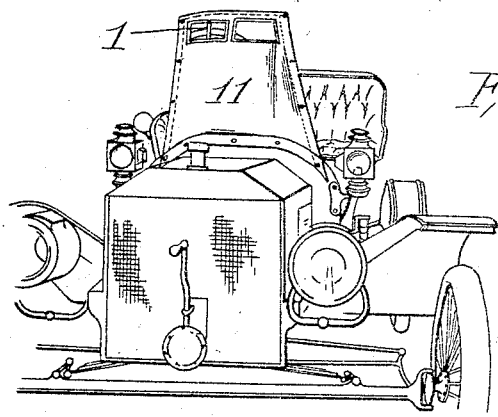
Figure 8:
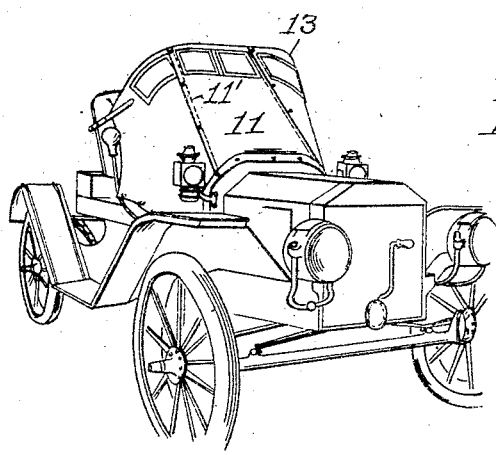
Figure 9:
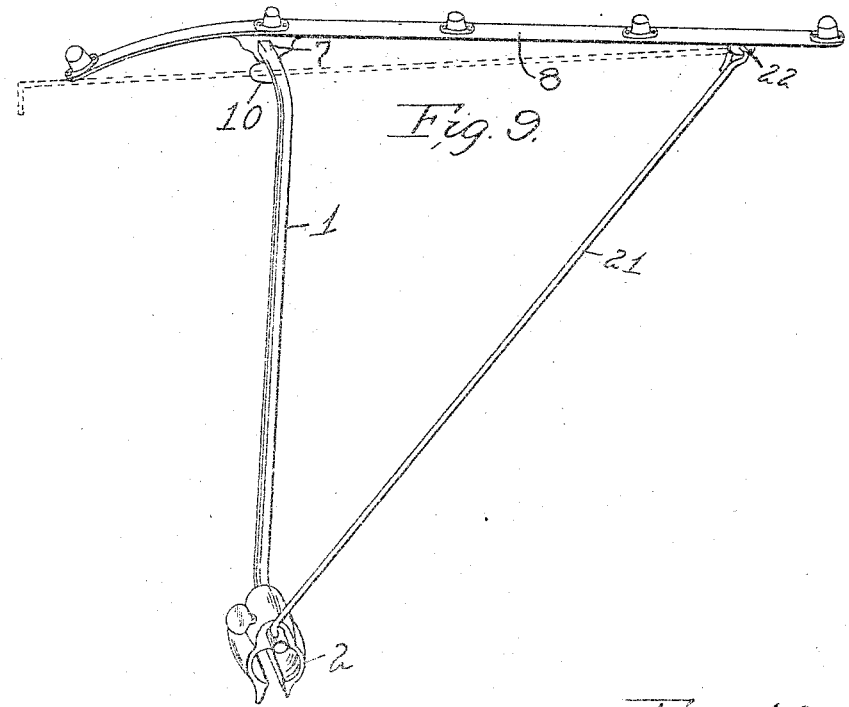
Figure 10:
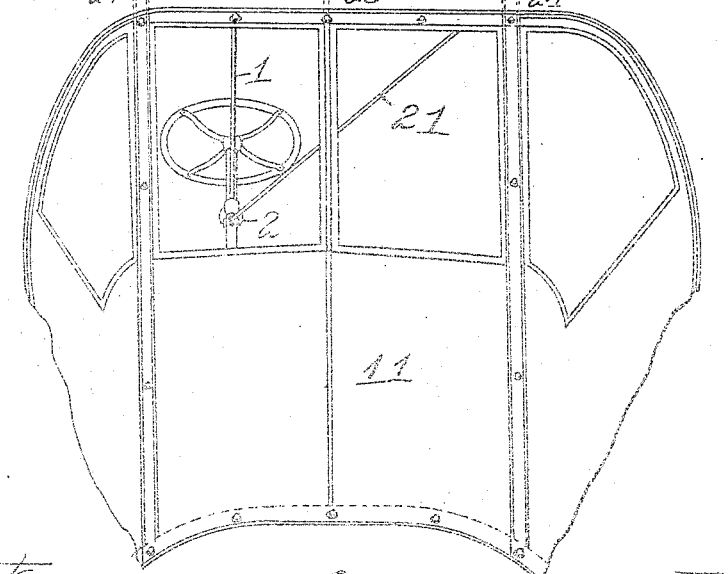

In the accompanying drawings Figure 1 is a side view of a portion of an automobile with my invention in place; Fig. 2 is a detail view of the rods and a straining or attaching connection; Fig. 2a is a detail view of a clamp; Figs. 3 and 3a are views of a clamp adapted to fit the steering post; Fig. 4 is a detail view of a clamp connection between the supporting bracket or arm and cross piece; Fig. 5 is a view of the upper end of the supporting arm; Figs. 6, 7 and 8 are perspective views showing the application of my invention to an automobile. Figs. 9 and 10 are views of a modification.

In carrying out my invention I support upon the inclined steering post a supporting arm 1 which has its lower end bent at an angle to the main part of the arm so as to lie parallel with the steering post to which it is held by a clamp 2. This clamp is composed of two parts, Fig. 3, held together by screws 3 and bolts 4, the latter being of such length as to permit a certain amount of adjustment of the clamp to fit different diameters of steering posts. The clamp has a socket 5 to receive the lower bent end of the supporting arm 1, wherein it is held by a set screw 6. The supporting arm extends upwardly from the steering post and approximately vertically, and at its upper end it is curved rearwardly, terminating at a point adjacent the periphery of the steering wheel, but allowing ample space between for the manipulation of the said wheel. This curved arm supports a cross piece by engaging a rectangular shaped socket 7 in a clip or bracket connected with the cross arm 8, for which purpose the curved arm has a flattened end at 9, as shown in Fig. 5, and a set screw is used at 10 for holding the parts together at this point. The cross arm extends to both sides of the curved supporting arm, that portion lying to the right being curved to conform substantially to the curve of the wheel, while that portion lying to the left is substantially straight, and is longer than the portion of the cross arm at the right. This cross arm has a series of buttons or studs thereon to receive the shield, which comprises a main portion 11 of any suitable flexible material having openings along its top edge to fit over the buttons on the cross piece, the said material extending from this cross piece to the dash where its lower front edge is attached by means of buttons to the said dash, but in such manner that it may be detached therefrom. This main portion of the shield has celluloid covered openings therein, to permit the driver to see through, so that a view may be had of the end of the hood and the mud guards sufficient for steering purposes. The side margins of this middle portion 11 are provided each with a hem into which is run a stiff steel wire 11', dotted lines, Fig. 8, to stiffen the said side edges to afford a support for the overlapping portions of the side flaps so that the shield will stand up in proper shape. It will be understood that the two end buttons on the cross piece, as well as the two corner buttons on the dash, are longer than the intermediate buttons in order to receive not only the main portion of the flexible shield, but the flexible side flaps as well. The general form of the main or central portion of the shield is slightly tapering from the dash to the cross arm, and it will be seen that as the stiffening wires or rods are applied only to the lateral edges of the shield, it may be rolled up into small compass when detached from the cross arm and the dash. This center portion of the shield may be used by itself under certain conditions. Combined with this center portion I employ side flaps, one on each side, that on the left hand side (from the driver's seat) being somewhat larger than the other flap, and these flaps are detachably secured to the main portion along the reinforced hem thereof, and also to the cross arm and to the dash, as shown in Fig. 8.

I have indicated in Figs. 2 and 2a a double hem at the upper or rear inclined edges of the side flaps, this double hem receiving two spring steel wires or rods 12 which are permanently bent down slightly at about the point 13. The upper corner of the hems of the side flaps are fastened to the ends of the cross arm by the buttons at these points, and the proper curve for the side flaps is produced by springing the lower ends of the two spring steel wires or rods inwardly and placing them in the cup-shaped clip at 14 supported on the side of the seat frame and also by attaching the strap 15 to the seat frame by a button at 16, the other end of the said strap being connected by a ring or hook 17 with a clamp 18 formed with double sockets 19 adapted to fit the double wire or rod in the rear hem of the side flap. The strap is adjustable at 20 to place the proper strain upon the stiffening rods of the hem, and the downward pull of this strap and the spring of the wire will hold the lower ends of the side flaps firmly in the cup-shaped clips. It will be understood that instead of reinforcing wires, other forms of reinforcement may be used, though it should be of a spring or flexible nature. As the side flaps are provided with the reinforced hem at only one edge, it will be observed that these side flaps can be rolled up into a small compass when detached from the main part of the shield and from the seat body. These side flaps are also provided with celluloid covered openings which will permit view of the forward part of the machine. It will be understood, of course, that the wires which are arranged in the side hems of the main portion constitute supports extending from the dash to the upper cross bar. The clamping plates 18 having two grooves or sockets to correspond with the two wires, grips the wires tight so that they can not slip in the hem and make a wrinkle in the shield. The clamp 2 may be slid along the steering post to adjust the shield to different types of machines.

In Fig. 9 I show a brace rod 21 extending from the lower end of the bracket rod where it enters a socket therein at an inclination upwardly and outwardly to the under side of the long arm of the cross piece 8 and near the end thereof. Here the brace rod or wire is pivotally connected with a clip 22 on the under side of the cross arm and riveted thereto. This brace rod may be detached from the bracket or supporting arm 1 so as to be swung up into the position indicated in dotted line in Fig. 9 to permit the shield to be rolled up. The lower end of this brace rod is bent at right angles to fit in the opening in the supporting post or arm at a point below the clamp. This brace stiffens the long end of the cross arm and prevents vibration, and its use enables me to make the shield higher and the cross arm longer so that the top of the higher portion of the shield may be as wide as the bottom, as shown in Fig. 10. Another feature of distinction in Fig. 10 over the forms first described is the addition of a middle wire 23 and two additional side wires 24, 25, all of these being located in the middle portion of the shield, making five parallel stiffening wires in all. As these wires are all parallel, the shield may be rolled up easily. All of the side wires are inserted in the hem, and the middle wire is attached by sewing the two edges of a narrow strip of the shield material up and down the inner side midway, forming a case into which the wire 23 is slipped. By means of these improvements shown in Figs. 9 and 10, I have been able to make the shield higher directing the wind entirely overhead, and yet making a firm structure not subject to vibration.

I claim as my invention:

In combination with the steering post, a supporting arm thereon extending upwardly and having a cross bar at its upper end, flexible shield material extending from the cross bar to the dash board, rods extending from the cross bar to the dash board along the lateral edges of the flexible material to reinforce the same, side flaps buttoned to the reinforced edges of the main portion of the shield material, and rods attached to the rear edges of the side flaps and extending from the cross bar to the frame of the machine, said rods together with the cross bar and the rods in between the same and the dash board acting as a truss frame for the shield and flaps, and straining means for drawing the rear rods of the side flaps into position on the frame of the vehicle, substantially as described.

In testimony whereof, I affix my signature in presence of two witnesses.

ALMER B. THOMAS.

Witnesses:
  FRANK T. TAYLOR,
  J. H. McLOUD.